United States

Maria Mes

3,685,883
Aug. 22, 1972

[54] APPARATUS FOR DETECTING THE ORIENTATION OF THE PLANE OF POLARIZATION OF A PLANE-POLARIZED BEAM OF RADIATION

[72] Inventor: Johannes Antonius Maria Mes, Emmasingel, Netherlands

[73] Assignee: U.S. Philips Corporation, New York, N.Y.

[22] Filed: Feb. 4, 1971

[21] Appl. No.: 112,721

[30] Foreign Application Priority Data

Feb. 7, 1970 Netherlands..............7001772

[52] U.S. Cl. ..................350/150, 350/157, 350/160
[51] Int. Cl................................................G02f 1/26
[58] Field of Search.......350/147, 150, 157, 160–161

[56] References Cited

UNITED STATES PATENTS 3,366,792  1/1968  Ohm..........................350/150
3,558,215  1/1971  DeLang et al. ............350/157

*Primary Examiner*—David Schonberg
*Assistant Examiner*—Paul R. Miller
*Attorney*—Frank R. Trifari

[57] ABSTRACT

An apparatus is described for detecting the orientation of the plane of polarization of a plane-polarized beam of radiation by means of a radiation-sensitive detection system.

It is shown that the insertion of an isotropic beam-splitting element in the path of the beam and the insertion of a series arrangement of at least three birefringent elements at least one of which is an electro-optical crystal in each of the paths of the sub-beams and the application to the electro-optical crystals traversed by one of the sub-beams of periodic voltages which differ in phase by one-fourth cycle with the periodic voltages applied to the electro-optical crystals traversed by the other sub-beam enable the orientation of a rotating plane of polarization to be accurately determined.

3 Claims, 3 Drawing Figures

PATENTED AUG 22 1972 3,685,883

*INVENTOR.*
JOHANNES A.M. MES

BY Frank R. Trifari

*AGENT*

APPARATUS FOR DETECTING THE ORIENTATION OF THE PLANE OF POLARIZATION OF A PLANE-POLARIZED BEAM OF RADIATION

The invention relates to an apparatus for detecting the orientation of the plane of polarization of a plane-polarized beam of radiation by means of a radiation-sensitive detection system.

The invention relates also to an apparatus which enables the orientation of a rotating plane of polarization to be detected. For this purpose, the apparatus according to the invention is characterized in that there is inserted into the path of the beam an isotropic beam-splitting element, and that there is inserted into each of the paths of the sub-beams produced by this element a series arrangement of at least three birefringent elements at least one of which is an electro-optical crystal, and in that there are applied to electro-optical crystals traversed by one of the sub-beams periodic voltages which differ in phase by one-fourth cycle with the periodic voltages applied to the corresponding electro-optical crystals traversed by the other sub-beam.

It should be noted that a series arrangement of three birefringent elements at least one of which is an electro-optical crystal is known.

The desired phase shift is realized by electro-optical means, an electronic phase shift being dispensed with.

The series arrangement preferably comprises two $\lambda/4$ plates having their optic axes oriented in the same direction between which there has been placed an electro-optical crystal having an orientation which differs by 45 percent from that of the $\lambda/4$ plates, a suitable periodic electric voltage being applied to the crystal.

The crystal may comprise several component crystals so that the amplitude of the voltage applied to each component crystal can be smaller than that applied to the undivided crystal by a factor proportional to the number of component crystals.

An embodiment of the invention will now be described, by way of example, with reference to the accompanying diagrammatic drawings, in which.

Figure 1:
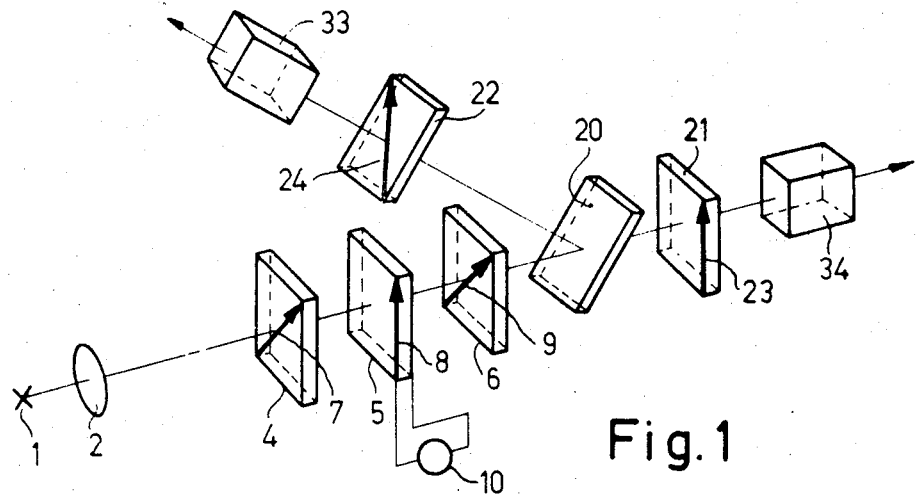
FIG. 1 shows a known apparatus for dynamically detecting the orientation of the plane of polarization of a beam of radiation.

In the apparatus shown in FIG. 1, plane-polarized radiation which emanates from a source 1 and is converted into a parallel beam by a lens 2 falls on the series arrangement of a $\lambda/4$ plate 4, a KDP-crystal 5 and a $\lambda/4$-plate 6, in that order. The optic axes 7 and 9 of the $\lambda/4$ plates 4 and 6 are parallel to one another, and the optic axes 8 of the crystal 5 is inclined at an angle of 45° to that of the plates 4 and 6. An alternating voltage $V = V_o \sin \Phi t$ is applied to the crystal 5. The emergent beam of radiation is divided in two sub-beams by a beam-splitting mirror 20 and the sub-beams fall on polarizers 21 and 22 the direction of polarization 23 and 24 respectively of which are at an angle of 45° to one another. The beams which emerge from the polarizers 22 and 21 are converted by detectors 33 and 34 respectively into electrical voltages of the form:

$S_1 = $ constant $+ S \sin(kz + b \sin \omega t)$ and $S_2 = $ constant $+ S \cos(kz + b \sin \omega t)$, where $kz$ indicates the orientation of the plane of polarization of the radiation emitted by the source 1.

Figure 2:
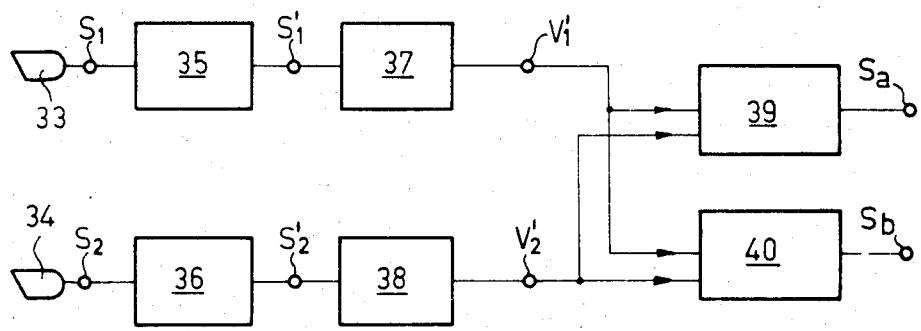
FIG. 2 shows in block-schematic form the associated electronic device for processing the signals.

These voltages may be processed in the manner which will now be described with reference to FIG. 2.

Band-pas filters 35 and 36 transmit only the components:

$S'_1 = A \cos(kz) \sin \omega t$ and $S'_2 = A \sin(kz) \sin \omega t$ of the signals $S_1$ and $S_2$ respectively. Further processing requires a 90° phase shift of one of the signals with respect to $\omega t$. However, for considerations of symmetry both signals are shifted in phase. A phase shifter 37 shifts $S'_1$ through $+45°$ and a phase shifter 38 shifts $S'_2$ through $-45°$. This corresponds to a phase shift of $S'_1$ relative to $S'_2$ through $+90°$. The signals $V'_1$ and $V'_2$ then will have the form:

$V'_1 = A \cos kz \cos \omega t$ and $V'_2 = -A \sin kz \sin \omega t$ \hfill (1)

The signals $V'_1$ and $V'_2$ are applied to amplifiers 39 and 40, in which they are added to one another and subtracted from one another respectively, resulting in the following signals:

$S_a = V'_1 + V'_2 = A \cos(kz + \omega t)$ and $S_b = V'_1 - V'_2 = A \cos(kz - \omega t)$.

These signals can be processed in known manner to produce digital counting pulses.

However, only for a given fixed frequency can the electronic phase shift be effected with the accuracy required for a correct determination of the orientation of the plane of polarization. The signals $S'_1$ and $S'_2$, which may be written:

$S'_1 = A/2 \{ \sin(\omega t + kz) + \sin(\omega t - kz) \}$ and $S'_2 = A/2 \{ \cos(\omega t + kz) - \cos(\omega t - kz) \}$ , have two frequencies $\left\{ \omega + \frac{\partial}{\partial t}(kz) \right\}$ and $\left\{ \omega - \frac{\partial}{\partial t}(kz) \right\}$ which are constant and equal only when $\frac{\partial}{\partial t}(kz) = 0$, in other words when the plane of polarization of the radiation emitted by the source 1 is stationary. When this plane of polarization is not stationary, the phase shift and hence the indication of the orientation given by the above-described apparatus will become less accurate.

The apparatus according to the invention enables the orientation of the plane of polarization to be determined with greater accuracy even when the plane of polarization is rotating. Tee invention is based on the recognition of effecting the phase shift by electro-optical means so that the electronic phase shifters may be dispensed with and the disadvantages inherent in them are avoided.

Figure 3:
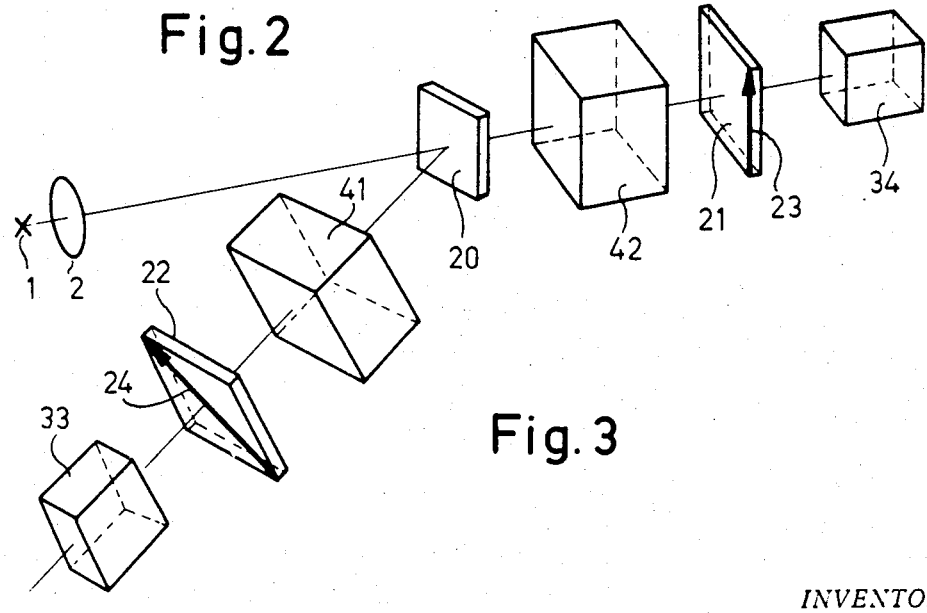
FIG. 3 shows an apparatus according to the invention.

FIG. 3 shows an embodiment of an apparatus according to the invention.

The plane-polarized radiation emitted by the source 1 and converted into a parallel beam by a lens 2 is divided into two sub-beams by an isotropic beam-splitting mirror 20. In the path of each sub-beam there is inserted a modulating device 41 and 42 respectively which comprises an electro-optical crystal and two $\lambda/4$ plates. The devices 41 and 42 each comprise the elements 4, 5 and 6 of FIG. 1. After having been modulated, the sub-beams pass through polarizers 22 and 21 respectively. The directions of polarization 23 and 24 of the polarizers 21 and 22 respectively are inclined at an angle of 45° to one another. The beams of radiation which emerge from the polarizers 21 and 22 are intercepted and converted into electric signals by detectors 34 and 33, respectively.

The electro-optical crystal of the modulating devices 41 and 42 are controlled by voltages:

$$V_1 = \beta \sin \omega t \text{ and}$$

$$V_2 = \beta \cos \omega t$$

respectively. The output signals of the detectors 33 and 34 will then be:

$$S_1 = \text{constant} + S \sin(kz + b \sin \omega t) \text{ and}$$

$$S_2 = \text{constant} - S \cos(kz + b \cos \omega t)$$

respectively. From these signals there are produced by filtering in a frequency band about the center frequency $\omega$ the signals:

$$S'_1 = A \cos kz \sin \omega t \text{ and}$$

$$S'_2 = -A \sin kz \cos \omega t$$

respectively. A comparison with (1) shows that these signals correspond to the signals produced in the known apparatus by electronic phase shifting. Addition and subtraction of the signals $S'_1$ and $S'_2$ result in the signals:

$$S_a = A \sin(kz + \omega t) \text{ and}$$

$$S_b = A \sin(kz - \omega t)$$

which may again be processed in known manner to form digital counting pulses. The said processing operations may again be performed by means of a device as shown in FIG. 2, which, however, does not include the phase shifters 37 and 38.

It should be noted that apart from the absorption in the electro-optical crystals the intensities of the beams of radiation incident on the detectors are equal in the apparatuses shown in FIGS. 1 and 3.

In the above described apparatuses two sinusoidal signals are applied to the electro-optical signals. However, alternatively two periodic signals of another form, such as periodic triangular signals, may be applied to the electro-optical crystals, provided that these signals have a mutual phase difference of one-fourth cycle.

What is claimed is:

1. An apparatus for detecting the orientation of the plane of polarization of a plane-polarized beam of radiation by means of a radiation-sensitive detection system, an isotropic beam-splitting element in the path of the beam, a series arrangement of at least three birefringent elements positioned in the path of each sub-beam produced by the beam splitting element, at least one of the birefringent elements being an electro-optic crystal, a separate polarizer in the path of radiation eminating from each series arrangement, and means for applying to the electro-optical crystals traversed by one of the sub-beams periodic voltages which differ in phase by one-fourth cycle with the periodic voltages applied to the corresponding electro-optical crystals traversed by the other sub-beam.

2. An apparatus as claimed in claim 1, wherein the series arrangement comprises two $\lambda/4$ plates which have optic axes oriented in the same direction and between which there is arranged an electro-optical crystal having an optic axis which differs by 45° from that of the $\lambda/4$ plates, a suitable periodic electric voltage being applied to this crystal.

3. An apparatus as claimed in claim 2, said electro-optical crystal comprising $n$ component crystals, the amplitude of the periodic voltage applied to each component crystal being $1/n$ times the periodic voltage necessary for exciting a crystal in a single crystal electro-optic modulator.

* * * * *

PO-1050
(5/69)

UNITED STATES PATENT OFFICE
CERTIFICATE OF CORRECTION

Patent No. 3,685,883            Dated August 22, 1972

Inventor(s) JOHANNES ANTONIUS MARIA MES

It is certified that error appears in the above-identified patent and that said Letters Patent are hereby corrected as shown below:

Col. 1, line 30, "their optic axes oriented in the same" should be --their principal directions oriented in the same direction--;

line 31, cancel "direction"

line 56, "optic axes" should be --principal directions--;

line 58, "optic axes" should be --principal directions--;

line 60, "$\phi t$" should be --$\omega t$--;

Col. 2, line 67, "Tee" should be --The--;

IN THE CLAIMS

Claim 2, line 3, "optic axes oriented in the same direction" should be --principal directions oriented in the same direction--;

line 5, "an optic axis" should be --a principal direction--.

Signed and sealed this 9th day of January 1973.

(SEAL)
Attest:

EDWARD M. FLETCHER, JR.            ROBERT GOTTSCHALK
Attesting Officer                  Commissioner of Patents